(12) United States Patent
Yun et al.

(10) Patent No.: US 10,887,554 B2
(45) Date of Patent: Jan. 5, 2021

(54) MOBILE TERMINAL WITH A PLURALITY OF CAMERAS RESPECTIVELY HAVING DIFFERENT FIELD OF VIEWS AND METHOD OF DISPLAYING MULTI-PREVIEWS IN THE SAME

(71) Applicant: LG ELECTRONICS INC., Seoul (KR)

(72) Inventors: Jiwon Yun, Seoul (KR); Eunyoung Noh, Seoul (KR); Seungmin Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/578,161

(22) Filed: Sep. 20, 2019

(65) Prior Publication Data
US 2020/0099894 A1 Mar. 26, 2020

(30) Foreign Application Priority Data
Sep. 21, 2018 (KR) ........................ 10-2018-0114429

(51) Int. Cl.
| | | |
|---|---|---|
| *H04N 7/18* | (2006.01) | |
| *H04N 5/225* | (2006.01) | |
| *H04N 5/232* | (2006.01) | |

(52) U.S. Cl.
CPC ........... *H04N 7/181* (2013.01); *H04N 5/2258* (2013.01); *H04N 5/23238* (2013.01)

(58) Field of Classification Search
CPC .. H04N 7/181; H04N 5/2258; H04N 5/23238; H04N 5/232935

USPC ......................................................... 348/143
See application file for complete search history.

(56) References Cited

U.S. PATENT DOCUMENTS

| | | | |
|---|---|---|---|
| 9,332,167 | B1 | 5/2016 | Pance |
| 2008/0012952 | A1 | 1/2008 | Lee |
| 2010/0277619 | A1 | 11/2010 | Scarff |
| 2011/0050963 | A1 | 3/2011 | Watabe |
| 2011/0261176 | A1* | 10/2011 | Monaghan, Sr. .... G02B 27/017 348/61 |
| 2014/0204244 | A1* | 7/2014 | Choi .................. H04N 5/23222 348/231.99 |

(Continued)

OTHER PUBLICATIONS

Safdarnejad et al, Spatio-Temporal Alignment of Non-Overlapping Sequences from Independently Panning Cameras (Year: 2017).*

(Continued)

*Primary Examiner* — Shan E Elahi
(74) *Attorney, Agent, or Firm* — Lee, Hong, Degerman, Kang & Waimey

(57) ABSTRACT

Provided is a mobile terminal including a plurality of cameras having different FOVs, the mobile terminal including: a display for displaying a preview sensed by an activated camera among the plurality of cameras; and a controller configured to control the plurality of cameras and the display, wherein the controller is configured for: controlling the display to output multi-previews of the plurality of cameras in response to a first signal indicating outputting the multi-previews of the plurality of cameras; when a camera of a field of view (FOV) smaller than a FOV of an activated camera among the plurality of cameras is deactivated, cropping a preview sensed by the activated camera and generating a preview of the deactivated camera using the cropped preview.

19 Claims, 13 Drawing Sheets

(56) References Cited

U.S. PATENT DOCUMENTS

2017/0034449 A1* 2/2017 Eum .................... H04N 5/2258
2017/0230585 A1* 8/2017 Nash ................... H04N 5/2258

OTHER PUBLICATIONS

European Patent Office Application Serial No. 19198573.8, Search Report dated Jan. 30, 2020, 8 pages.

* cited by examiner

[FIG. 1A]
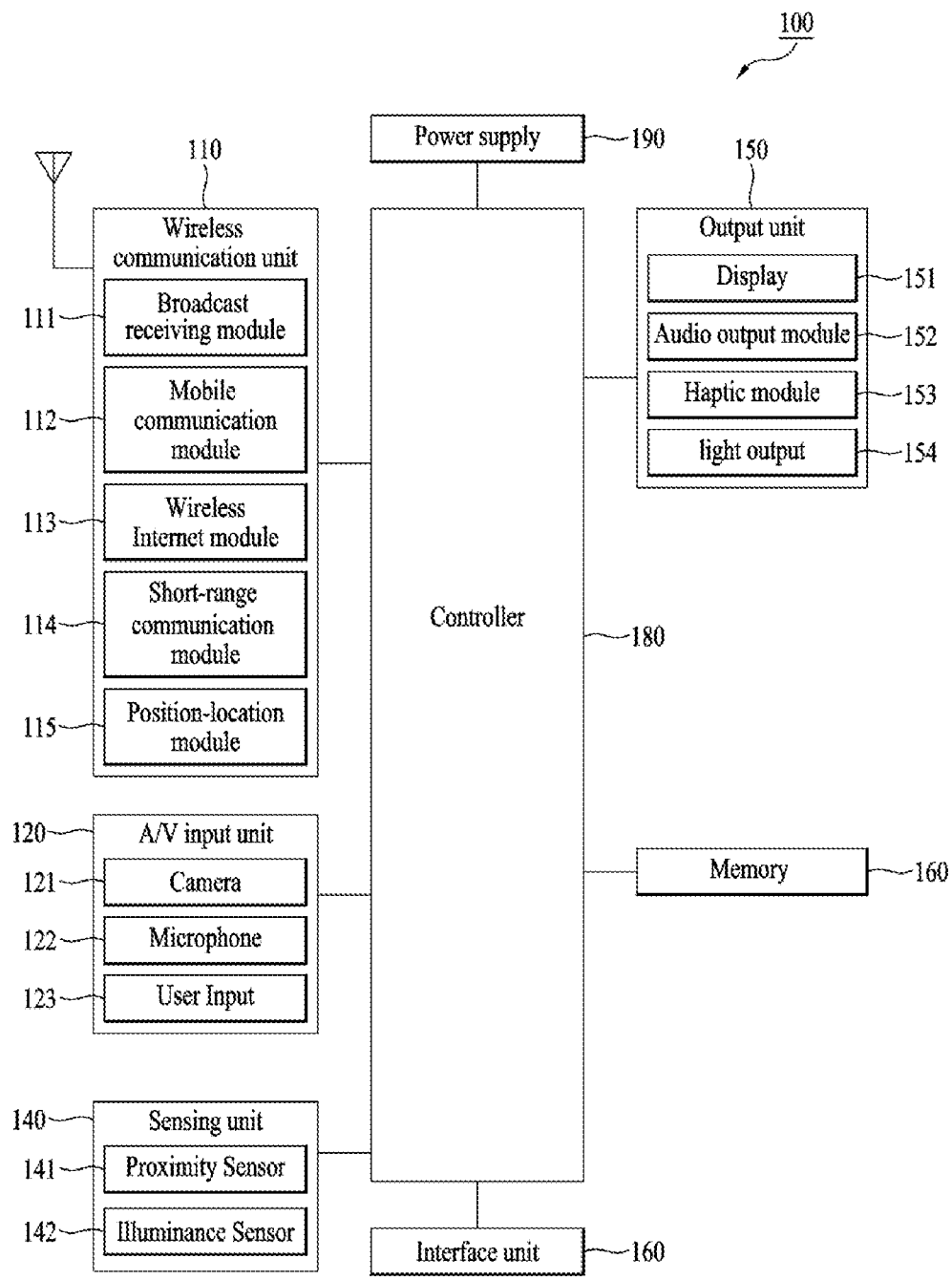

[FIG. 1B]
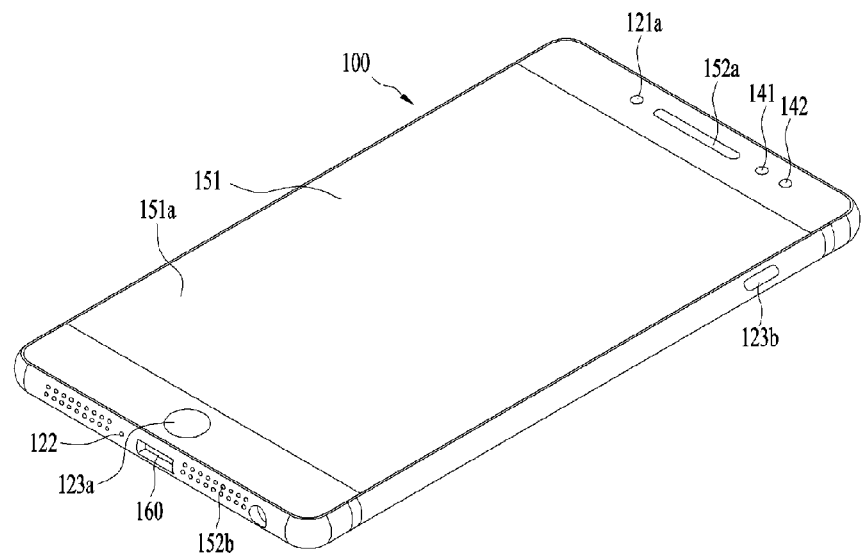

[FIG. 1C]
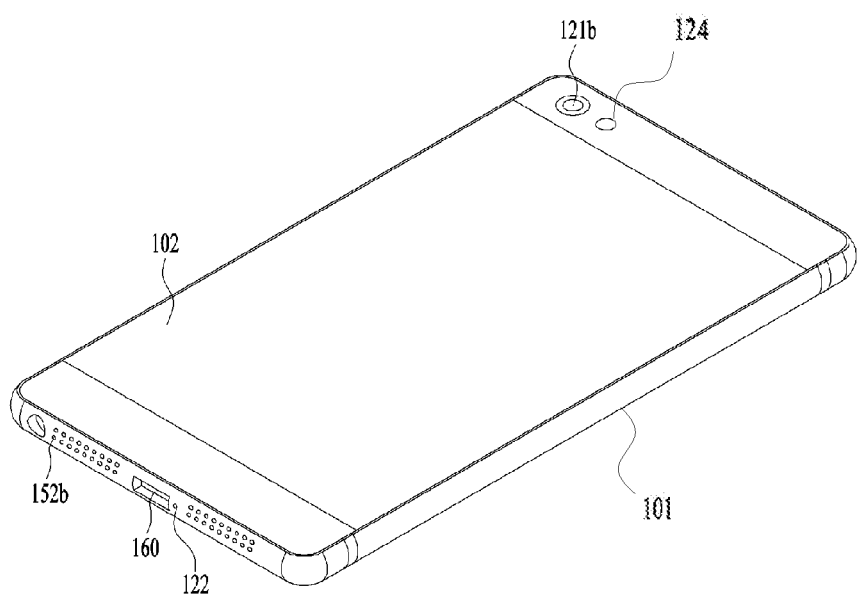

[FIG. 2]
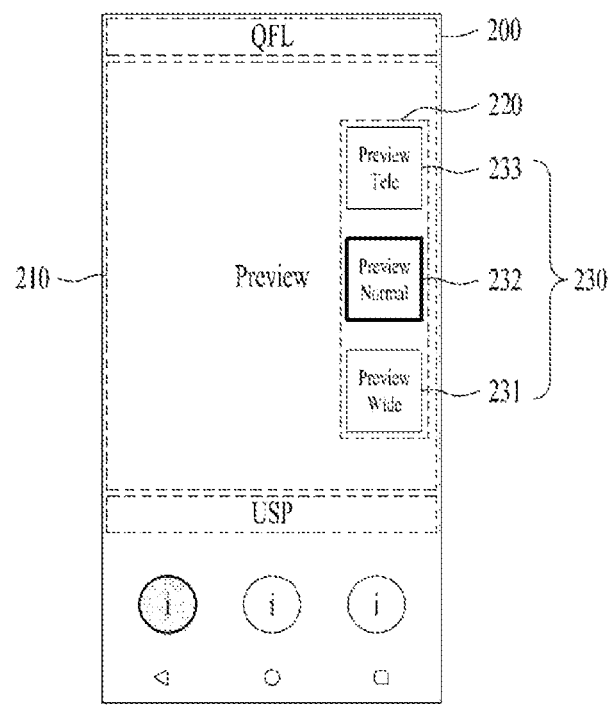

[FIG. 3]
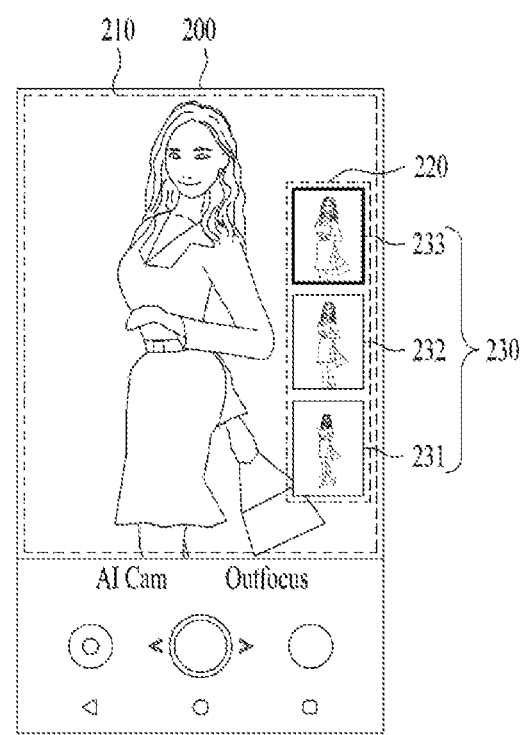

[FIG.4]

| View Angle of Preview window | Wide angle camera | Regular angle camera | Telephoto angle camera |
|---|---|---|---|
| Wide angle | O | X | X |
| Regular angle | O | O | X |
| Telephoto angle | O | X | O |

[FIG.5]
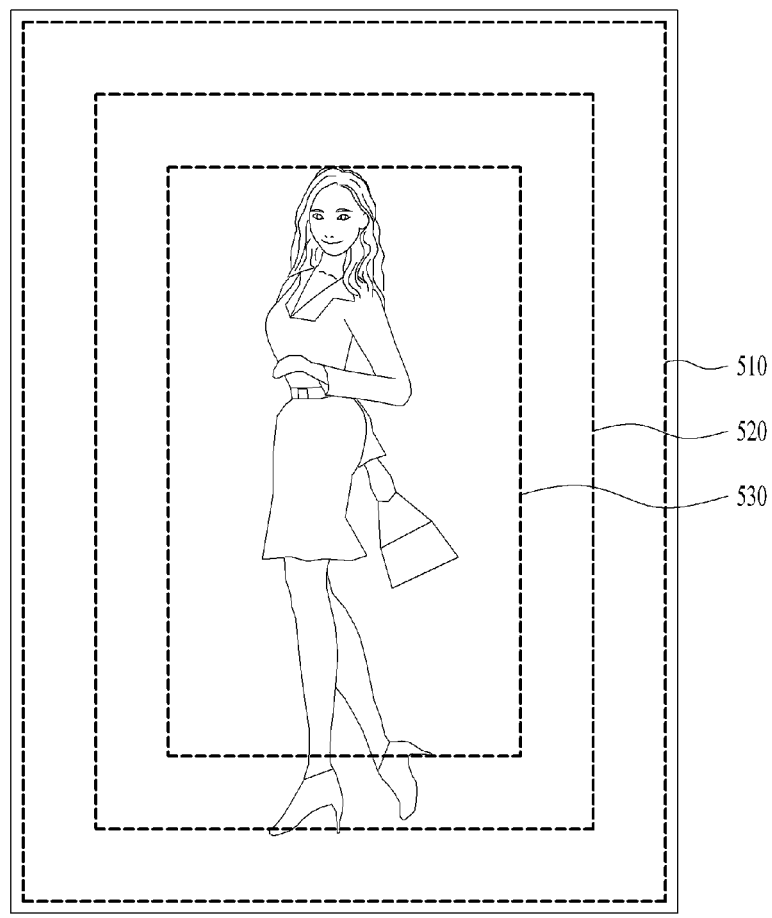

[FIG.6]
(a)
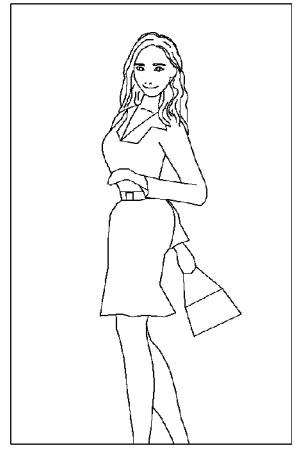
(b)
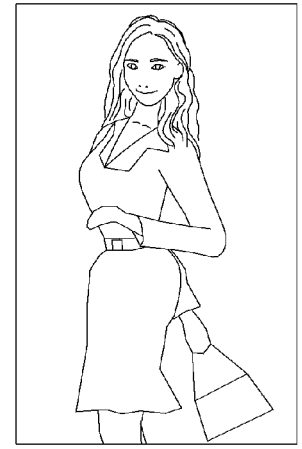
(c)

[FIG.7]
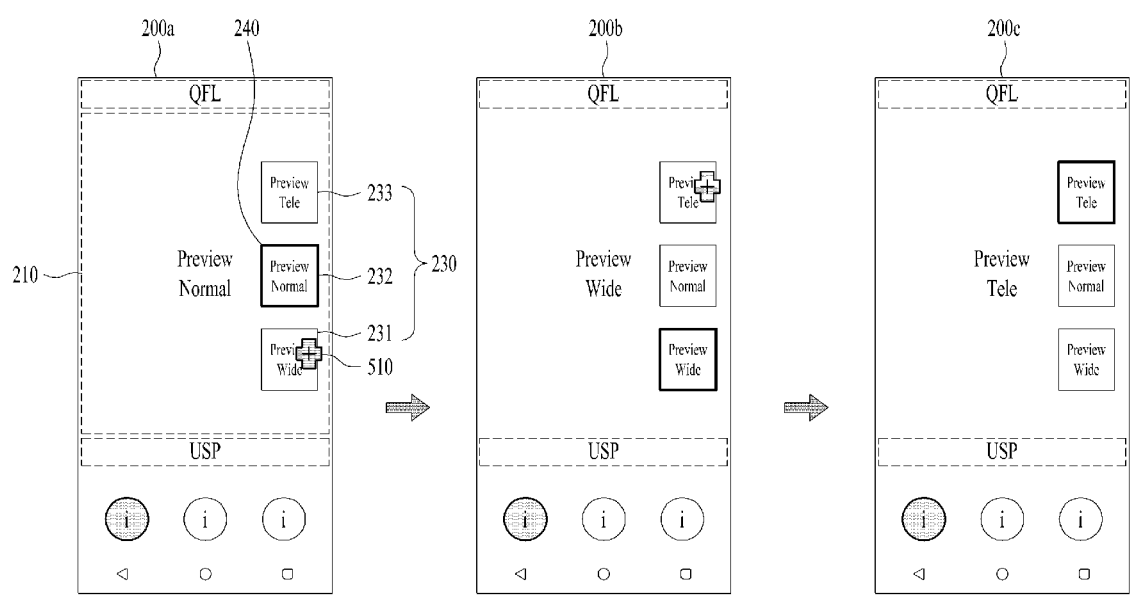

[FIG.8]
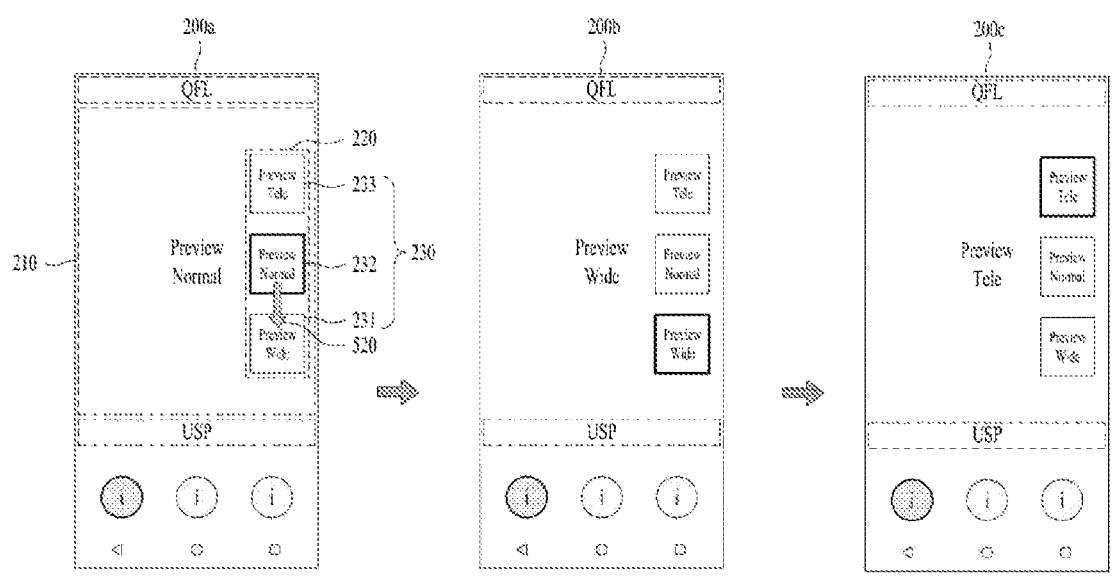

[FIG.9]
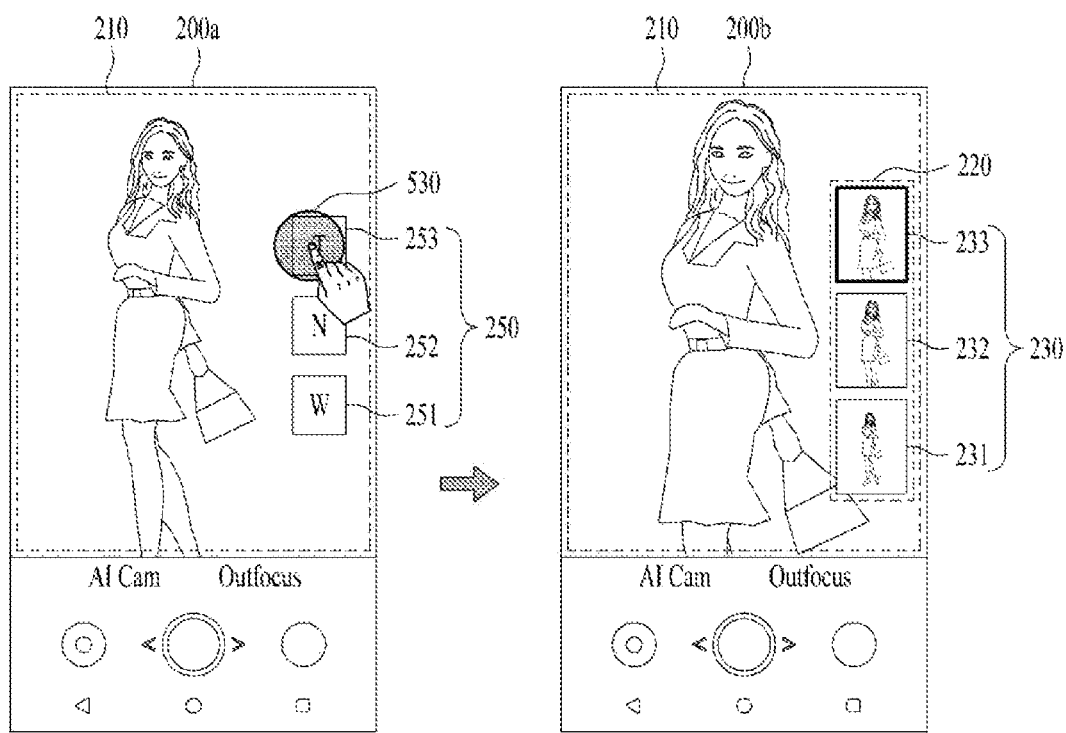

[FIG.10]
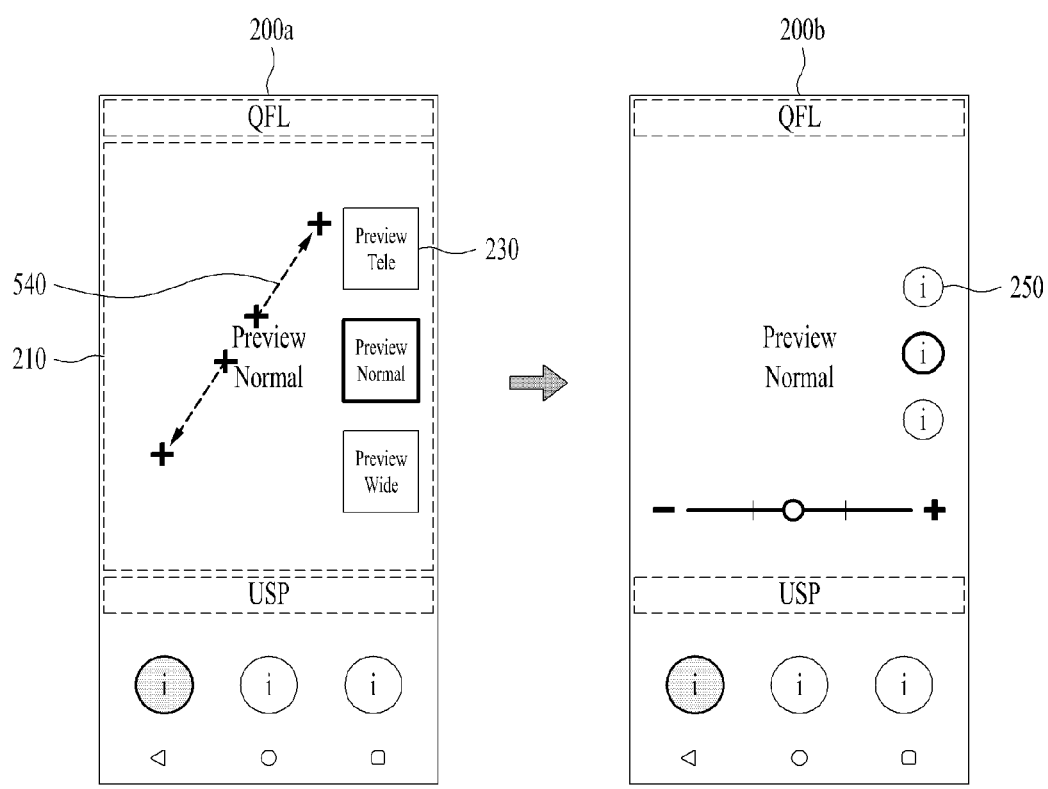

[FIG.11]
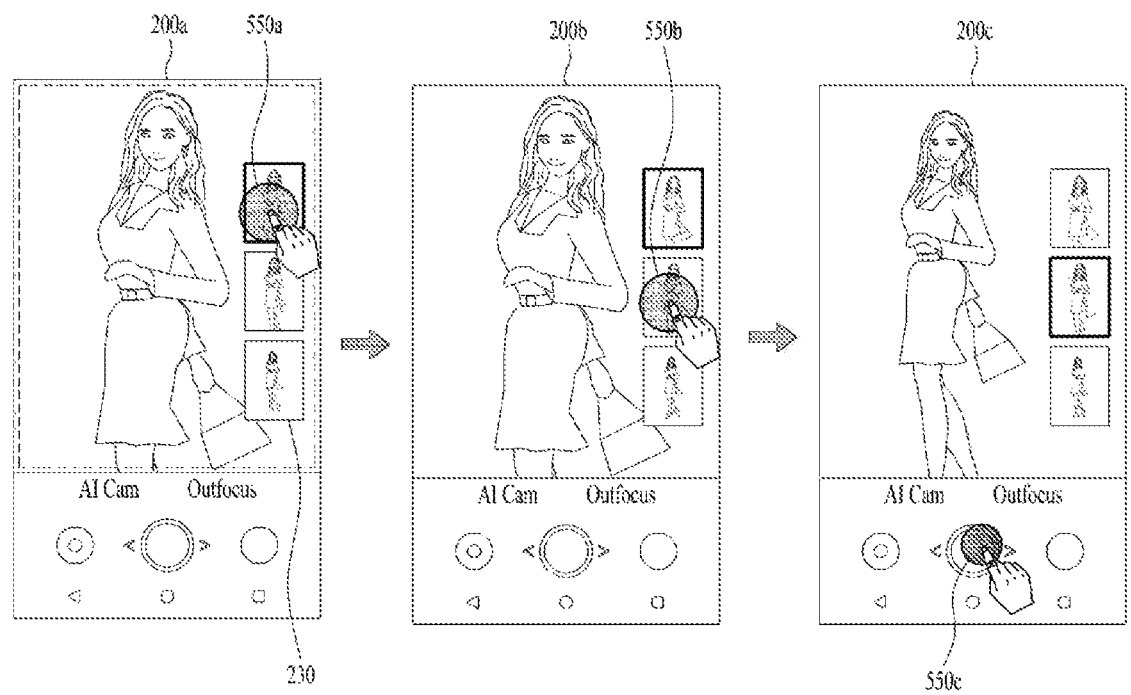

MOBILE TERMINAL WITH A PLURALITY OF CAMERAS RESPECTIVELY HAVING DIFFERENT FIELD OF VIEWS AND METHOD OF DISPLAYING MULTI-PREVIEWS IN THE SAME

CROSS-REFERENCE TO RELATED APPLICATIONS

Pursuant to 35 U.S.C. § 119(a), this application claims the benefit of earlier filing date and right of priority to Korean Patent Application No. 10-2018-0114429, filed on Sep. 21, 2018, the contents of which are all hereby incorporated by reference herein in their entirety.

BACKGROUND

1. Field

The present disclosure relates to a mobile terminal. More particularly, the present disclosure may be applied to a technical field in which a mobile terminal including a plurality of cameras having different FOVs (Field Of Views) provides multi-previews.

2. Description of Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

One of the most important functions of the multimedia device is an imaging function. Accordingly, a mobile terminal is equipped with a plurality of cameras that provide a plurality of FOVs (Field of Views) respectively.

In this connection, when the previews corresponding to the plurality of cameras are output at the same time, it is easy for the user to select the optimal FOV for photo-imaging.

However, in order to output the previews corresponding to the plurality of cameras at the same time, the number of the ISPs (Image Signal Processors) are required as many as the number of cameras.

However, the increase in the number of ISPs may lead to a cost increase, to an increase in a size of the mobile terminal, to a power consumption increase, and to a processing speed decrease.

SUMMARY

The present disclosure aims to provide a mobile terminal including a plurality of cameras having different FOVs (Field Of Views) in which the previews corresponding to the plurality of cameras may be displayed at the same time while minimizing the number of required ISPs.

In one aspect of the present disclosure, there is provided a mobile terminal including a plurality of cameras having different FOVs, the mobile terminal including: a display for displaying a preview sensed by an activated camera among the plurality of cameras; and a controller configured to control the plurality of cameras and the display, wherein the controller is configured for: controlling the display to output multi-previews of the plurality of cameras in response to a first signal indicating outputting the multi-previews of the plurality of cameras; when a camera of a field of view (FOV) smaller than a FOV of an activated camera among the plurality of cameras is deactivated, cropping a preview sensed by the activated camera and generating a preview of the deactivated camera using the cropped preview.

In one implementation, the controller is further configured for: when a camera of a field of view (FOV) larger than a FOV of an activated camera among the plurality of cameras is deactivated, further activate a camera of a largest FOV among the plurality of cameras such that the camera of the largest FOV senses a preview thereof.

In one implementation, the controller is further configured for cropping a preview sensed by at least one of the two activated cameras and generating a preview of the deactivated camera using the cropped preview.

In one implementation, the controller is further configured for switching an activated camera between the plurality of cameras in response to a second signal indicating selecting one of the multi-previews.

In one implementation, the controller is further configured for activating a camera corresponding to the selected preview in response to the second signal and deactivating remaining cameras.

In one implementation, the controller is further configured for stopping outputting the multi-previews in response to the second signal.

In one implementation, the controller is further configured for: maintaining outputting the multi-previews in response to the second signal; and when a camera activated in response to the second signal has a FOV smaller than the largest FOV, maintaining a camera with the largest FOV to be in an active state.

In one implementation, the controller is further configured for: cropping a preview sensed by a camera which has been activated in response to the second signal; and generating a preview of the deactivated camera using the cropped preview.

In one implementation, the display includes: a first region in which a preview sensed by the activated camera is output; a second region in which each of the multi-previews is output, wherein the controller is further configured for controlling the display to output a preview sensed by a camera activated in response to the second signal in the first region.

In one implementation, the display includes a touch screen for receiving a touch input signal, wherein the controller is further configured for: when the second signal is input by an user dragging a touch point toward and touching a second region corresponding to a target multi-preview, zooming in or out the preview output in the first region based on the dragging direction; and activating a camera corresponding to the target multi-preview among the plurality of cameras.

In one implementation, the controller is further configured for controlling the display to apply a graphical effect to a multi-preview output in the second region corresponding to a preview output in the first region.

In one implementation, the display includes: a first region in which a preview sensed by the activated camera is output; a second region in which each of the multi-previews is output, wherein the controller is further configured for capturing a preview sensed by a camera activated in response to the second signal during recording a preview output in the first region.

In one implementation, the multi-previews act as a plurality of live thumbnails corresponding to FOVs of the plurality of cameras respectively.

In one implementation, the display includes a touch screen for receiving a touch input signal, wherein the first signal is input in response to an user touching a FOV information icon displayed on the display and corresponding to a FOV of each of the plurality of cameras for a predetermined time duration or greater.

Effects of the present disclosure are as follows but are not limited thereto.

According to at least one of the embodiments of the present disclosure, the previews corresponding to the plurality of cameras may be output at a time.

According to at least one of the embodiments of the present disclosure, the previews corresponding to the plurality of cameras may be output at a time while only one or two ISPs are required.

In addition to the effects as described above, specific effects of the present disclosure are described together with specific details for carrying out the invention.

BRIEF DESCRIPTION OF THE DRAWINGS

FIG. 1A is a block diagram illustrating a mobile terminal according to the present disclosure.

FIG. 1B and FIG. 1C are conceptual diagrams of one example of a mobile terminal according to the present disclosure when viewed in different directions.

FIG. 2 and FIG. 3 are diagrams illustrating an embodiment for displaying multi-previews of a plurality of cameras in accordance with the present disclosure.

FIG. 4 is an illustration of an implementation table of cameras activated to generate multi-previews according to the present disclosure.

FIG. 5 shows comparison between FOVs of the wide angle camera, normal angle camera and tele-photo camera.

FIG. 6 shows previews of the wide angle camera, a normal angle camera, and a tele-photo camera.

FIG. 7 illustrates an embodiment of changing a main preview output to the mobile terminal using multi-previews according to the present disclosure.

FIG. 8 illustrates an embodiment of changing a main preview output to the mobile terminal in response to a drag-touch input according to the present disclosure.

FIG. 9 shows an example of displaying multi-previews by touching a FOV information icon according to the present disclosure.

FIG. 10 is a diagram showing an embodiment in which a user pinch zooms in/out a main preview with referring to multi-previews according to the present disclosure.

FIG. 11 shows an example of capturing an image during recording using multi-previews according to the present disclosure.

DETAILED DESCRIPTIONS

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. In general, a suffix such as "module" and "unit" may be used to refer to elements or components. Use of such a suffix herein is merely intended to facilitate description of the specification, and the suffix itself is not intended to give any special meaning or function. The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an A/V input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

As one example, the controller 180 controls some or all of the components illustrated in FIGS. 1A-1C according to the execution of an application program that have been stored in the memory 170.

FIGS. 1B and 1C are conceptual views of one example of the mobile terminal, viewed from different directions;

The mobile terminal includes a display unit 151, a first and a second audio output modules 152a/152b, a proximity sensor 141, an illumination sensor 142, an optical output module, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 152a, the proximity sensor 141, an illumination sensor 142, the optical output module, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover is shown coupled to the rear case 102 for shielding the battery 191, to prevent separation of the battery 191, and to protect the battery 191 from an external impact or from foreign material. When the battery 191 is detachable from the terminal body, the rear case may be detachably coupled to the rear case 102.

FIG. 2 and FIG. 3 are diagrams illustrating an embodiment for displaying multi-previews 230 of a plurality of cameras in accordance with the present disclosure.

One of the most important functions of the multimedia device is an imaging function. Accordingly, a mobile terminal is equipped with a plurality of cameras that provide a plurality of FOVs (Field of Views) respectively.

A plurality of cameras may be included on one face of the mobile terminal to capture an image of the same object according to different FOVs.

FIG. 1C shows an embodiment including one second camera 121b on the back of the mobile terminal, but a plurality of second cameras 121b may be provided with different FOV FOVs.

Recently, a mobile terminal is equipped with a number of cameras that are larger than the number of ISPs (Image Signal Processors). In this case, it is impossible to capture an image at a time using the plurality of cameras.

The plurality of cameras may include a wide angle camera, a normal angle camera, a tele-photo camera. However, in some cases, a camera with a different FOV may be further included.

In order to simultaneously output the previews sensed by the plurality of cameras onto a display 200 of the mobile terminal, the number of ISPs corresponding to the number of cameras of the plurality should be included.

For example, in order to simultaneously output the previews sensed using a wide angle camera, a normal (regular) angle camera, and a tele-photo camera onto the display 200 of the mobile terminal, three ISPs should be required.

However, it is not desirable that the number of ISPs is adjusted to the number of cameras, because the increase in the number of ISPs increases a cost, increases the size of the mobile terminal, increases the power consumption thereof, and degrades a processing speed.

Therefore, the present disclosure aims to provide a method for simultaneously outputting previews corresponding to at least two cameras using two ISPs.

To this end, a mobile terminal including a plurality of cameras having different FOVs according to the present disclosure may include a display 200 that outputs a preview as sensed by an activated camera among the plurality of cameras, and a controller that controls the plurality of cameras and the display 200.

The controller may include two ISPs (image signal processors).

The controller controls the display to output the multi-previews 230 of the plurality of cameras in response to a first signal outputting the multi-previews 230 of the plurality of cameras. When the camera of the FOV smaller than the FOV of the activated camera among the plurality of cameras is deactivated, the controller may crop a preview that is sensed by the deactivated camera to generate a preview of the activated camera.

Specifically, referring to FIGS. 2 and 3, the mobile terminal outputs a preview sensed by a currently activated camera in a first region 210 of the display 200 and output multi-previews 230 corresponding to the plurality of cameras included in the mobile terminal into a second region 220 of the display 200.

FIG. 2 and FIG. 3 illustrate an embodiment in which the plurality of cameras of different FOVs include the wide angle, normal angle, and tele-photo camera. However, the number of cameras is not limited to three.

The multi-previews 230 may include a preview 231 corresponding to the FOV of the wide angle camera, a preview 232 corresponding to the FOV of the normal angle camera, and a preview 233 corresponding to the FOV of the tele-photo camera.

Since the mobile terminal according to the present disclosure includes two ISPs, the mobile terminal may not simultaneously detect the previews of three or more cameras.

Accordingly, the mobile terminal according to the present disclosure may crop the preview as sensed by the activated camera, and generate a preview of the deactivated camera using the cropped preview when the FOV of the deactivated camera is smaller than the FOV of the activated camera, thereby to reduce the number of necessary ISPs.

However, if the FOV of the deactivated camera is larger than the FOV of the activated camera, it is not possible to generate the preview of the deactivated camera by cropping a preview sensed by the activated camera.

Therefore, the mobile terminal according to the present disclosure may solve the problem by including an ISP for sensing the preview of the activated camera and a separate ISP.

Specifically, the controller of the mobile terminal according to the present disclosure may be configured to, when the camera of the FOV larger than the FOV of the activated camera among the plurality of cameras is deactivated, further activate a camera of the largest FOV among the plurality of cameras to preview a preview thereof.

The camera of the largest FOV that is further activated may sense the preview using a separate ISP.

When the controller further activates the camera of the largest FOV among the plurality of cameras, the controller may crop a preview sensed by at least one of the two activated cameras and generate a preview of the deactivated camera using the cropped preview.

Hereinafter, an example of a process of further activating a camera in response to a camera being deactivated when receiving the first signal and a process of cropping a sensed preview is illustrated.

FIG. 4 is an implementation table 400 of cameras activated to generate multi-previews according to the present disclosure.

Table 4 of FIG. 4 shows the plurality of cameras having different FOVs in a first region 410. The cameras activated to output the multi-previews 230 of the plurality of cameras (see FIG. 2) are indicated in a second region 420 and a third region 430.

The table 400 of FIG. 4 shows an embodiment in which the plurality of cameras include a wide angle camera, a normal (regular) angle camera, and a tele-photo camera. However, a process illustrated below may be equally applied to a case where there are at least four cameras.

Referring to the table 400 of FIG. 4, when the first signal for outputting the multi-previews 230 (see FIG. 2) is detected (before outputting the multi-previews), a camera activated to output a preview in a first region 210 (see FIG. 2) may be a wide angle camera. In this case, the controller does not need to further activate the normal angle camera and tele-photo camera. Alternatively, when the first signal for outputting the multi-previews 230 (see FIG. 2) is detected (before outputting the multi-previews), a camera activated to output a preview in a first region 210 (see FIG. 2) may be a normal angle camera. In this case, the controller should further activate the wide angle camera. Alternatively, when the first signal for outputting the multi-previews 230 (see FIG. 2) is detected (before outputting the multi-previews), a camera activated to output a preview in a first region 210 (see FIG. 2) may be a tele-photo a camera. In this case, the controller should further activate the wide angle camera.

Accordingly, in order that the mobile terminal including a normal angle camera, a tele-photo camera, and a wide angle camera uses the two ISPs to generate the multi-previews 230, the mobile terminal may activate only the wide angle camera, activate both of the wide angle camera and normal angle camera, or activate both of the wide angle camera and tele-photo camera.

Specifically, a method for generating the multi-previews 230 will be described in each of a case when activating only the wide angle camera, a case when activating both of the wide angle camera and normal angle camera, and a case when activating both of the wide angle camera and tele-photo camera.

If the camera activated to output the preview to the first region 210 at the time of detecting the first signal is a wide angle camera, the previews of the remaining deactivated cameras may be generated by cropping the preview sensed by the wide angle camera in a corresponding manner to the FOVs of the remaining deactivated cameras.

Further, if the camera activated to output the preview to the first region 210 at the time of detecting the first signal is a normal angle camera, the preview of the deactivated tele-photo camera may be generated by cropping the preview sensed by the normal angle camera in a corresponding manner to the FOV of the tele-photo camera. In this connection, the normal angle camera may sense the preview thereof using a first ISP while the wide angle camera may sense the preview thereof using a second ISP.

Further, if the camera activated to output the preview to the first region 210 at the time of detecting the first signal is a tele-photo camera, the wide angle camera senses the preview thereof using the second ISP. The preview of the deactivated normal angle camera may be generated by cropping the preview sensed by the wide angle camera which is further activated.

That is, when the mobile terminal according to the present disclosure detects the first signal, the camera activated to output a preview in the first region 210 is the camera having the largest FOV. In this case, the controller may use only the first ISP to generate the previews of the remaining deactivated cameras. Alternatively, when the mobile terminal according to the present disclosure detects the first signal, the camera activated to output a preview in the first region 210 is not the camera having the largest FOV. In this case, the controller may further activate the camera of the largest FOV to preview the remaining one ISP, and thus the camera of the largest FOV may sense the preview thereof using the second ISP. Then, the preview of the remaining deactivated camera may be generated by cropping the previews that are sensed by the two activated cameras.

Using the same process, the mobile terminal according to the present disclosure can simultaneously output the previews of three or more cameras using only two ISPs.

FIG. 5 shows comparison between FOVs of the wide angle camera, normal angle camera and tele-photo camera. FIG. 6 shows previews of the wide angle camera, a normal angle camera, and a tele-photo camera.

The wide angle camera, normal angle camera and tele-photo camera may generate corresponding previews by sensing the same object at different FOVs in the same direction.

The FOV 1 510 of the wide angle camera is the largest. The FOV 2 520 of the normal angle camera is contained in the FOV 1 510 of the wide angle camera. The FOV 3 530 of the tele-photo camera is contained in the FOV 2 520 of the normal angle camera.

Therefore, when sensing the preview using the wide angle camera, the controller may generate the previews of the deactivated normal angle camera and tele-photo camera by cropping the preview of the wide angle camera.

Specifically, FIG. 6(a) shows the preview corresponding to the wide angle camera. FIG. 6(b) shows the preview corresponding to the normal angle camera. FIG. 6(c) shows the preview corresponding to the tele-photo camera.

The previews corresponding to the cameras have the same size. Thus, when generating the preview of the deactivated camera, the controller may crop the preview sensed by the currently activated camera and expand the cropped preview to be adapted to a size of the preview that the currently deactivated camera senses when being previously activated.

Therefore, when the cropped preview is expanded, the expanded preview may have a deteriorated quality.

However, the multi-previews 230 (FIG. 2) may act as a plurality of live thumbnails outputted in a corresponding manner to the FOVs of the plurality of cameras which may provide intuitive FOVs comparison to the user. Thus, the image quality of the multi-previews 230 may not be an important factor. In other words, when the cropped preview is expanded, the expanded preview may have a deteriorated quality. However, this may not be problematic. Further, as described with reference to FIG. 2, each of the multi-previews 230 may be display in each second region 220 (FIG. 2), which is smaller than the first region 210 (FIG. 2) that outputs the main preview, the deteriorated quality of the expanded preview does not matter.

Hereinafter, an embodiment will be described in which a corresponding multi-preview 230 is used to change a main preview output to the first region 210 (FIG. 2).

FIG. 7 to FIG. 9 illustrate an embodiment of changing the main preview output to the mobile terminal using a corresponding multi-preview 230 according to the present disclosure.

When the controller changes the main preview to be output to the first region 210 using the multi-previews 230, the controller should change a currently activated camera. The main preview output in the first region 210 is not the preview generated via cropping but needs to be a preview directly sensed by the currently activated camera. Thus, the main preview may be displayed to the user without reducing the image quality thereof.

To this end, the controller included in the mobile terminal according to the present disclosure may change the currently activated camera among the plurality of cameras in response to a second signal for selecting one of the multi-previews 230.

When the terminal stops outputting the main preview 230 in response to the second signal, only the camera corresponding to the selected preview in response to the second signal is maintained or changed in the activated state while the remaining cameras are disabled.

Specifically, when the preview selected in response to the second signal is the cropped preview, the camera corresponding to the selected preview may be activated while the remaining activated cameras may be deactivated. In this connection since the multi-previews 230 are not displayed, the controller does not need to execute both ISPs to output the multi-previews.

Further, when the preview selected in response to the second signal is a preview sensed by the activated camera, the camera corresponding to the selected preview remains active. In this case, when there is a currently activated camera among the remaining cameras, the currently activated camera may be deactivated.

However, when the controller keeps outputting the multi-previews 230 in response to the second signal, the controller needs to change the currently activated camera to output the multi-previews 230.

That is, the controller included in the mobile terminal according to the present disclosure maintains outputting the multi-previews 230 in response to the second signal. in this connection, when the camera activated in response to the second signal has a smaller FOV than the largest FOV, the camera with the largest FOV may remain active. Further, the controller may crop a preview sensed by the camera which has been activated in response to the second signal, and generate a preview of the deactivated camera using the cropped preview.

Specifically, an example of maintaining the main preview 230 in response to the second signal will be described with reference to FIG. 7.

The multi-previews 230 may include a graphic effect 240 corresponding to the main preview output in the first region 210.

The graphical effect 240 shown in FIG. 7 may include a graphical effect by which an outline of the preview among the multi-previews 230 corresponding to the FOV of the camera that senses the main preview output in the first region 210 is darkly displayed. The graphical effect 240 is not limited thereto.

FIG. 7 shows an embodiment of a mobile terminal including a wide angle camera, a normal angle camera and a tele-photo camera. However, the number of cameras may be fourth or more.

A first display 200*a* corresponds to an embodiment in which the multi-previews 230 are output while sensing a main preview using a normal angle camera.

A second display 200*b* corresponds to an embodiment in which the multi-previews 230 are output while sensing a main preview using a wide angle camera in response to the second signal for selecting 510 the preview 231 corresponding to the FOV of the wide angle camera among the multi-previews 230 in the first display 200*a*.

A third display 200*c* corresponds to an embodiment in which the multi-previews 230 are output while sensing a main preview using a tele-photo camera in response to the second signal for selecting 510 the preview 233 corresponding to the FOV of the tele-photo camera among the multi-previews 230 in the second display 200*b*.

In the first display 200*a*, a wide angle camera and a normal angle camera are activated, while a tele-photo camera is deactivated.

In the second display 200*b*, only the wide angle camera is activated.

In third display 200*c*, the wide angle camera and tele-photo camera are activated.

When the displaying of the main preview is maintained as illustrated in FIG. 7, the activated camera may change in response to the second signal.

The controller included in the mobile terminal according to the present disclosure may crop a preview sensed by the camera which has been activated in response to the second signal and generate a preview of the deactivated camera using the cropped preview.

In FIG. 7, the first display 200*a* corresponds to an embodiment in which the controller generates a preview of a tele-photo camera by cropping the preview sensed by a normal angle camera. The second display 200*b* corresponds to an embodiment in which the controller generates previews of the normal angle camera and the tele-photo camera by cropping the preview sensed by the wide angle camera. The third display 200*c* corresponds to an embodiment in which the controller generates a preview of the normal angle camera by cropping the preview sensed by the wide angle camera.

That is, the activated states of the plurality of cameras may be changed in response to the second signal. Therefore, the preview generated via the cropping may be changed.

FIG. 8 is a view showing an embodiment in which the main preview outputted in the first region 210 is zoomed in or out in response to a drag-touch input 520.

The displays 200*a*, 200*b*, or 200*c* of the mobile terminal according to the present disclosure may include a touch screen for receiving a touch input signal.

When the second signal for selecting one of the multi-previews 230 is the touch input signal 520 input by the user dragging a touch point in a specific direction, that is, toward a target second region 220, the controller of the mobile terminal according to the present disclosure may zoom in or out the main preview output in the first region 210 based on the dragging direction in response to the touch input 520 and may change the active camera among the plurality of cameras included in the mobile terminal.

A first display 200a corresponds to an embodiment in which multi-previews 230 are output while sensing a main preview by a normal angle camera.

A second display 200b corresponds to an embodiment in which the multi-previews 230 are output while sensing a main preview using a wide angle camera in response to the second signal for dragging a touch point toward and touching 520 the preview 231 corresponding to the FOV of the wide angle camera among the multi-previews 230 in the first display 200a.

A third display 200c corresponds to an embodiment in which the multi-previews 230 are output while sensing a main preview using a tele-photo camera in response to the second signal for dragging a touch point toward and touching 510 the preview 233 corresponding to the FOV of the tele-photo camera among the multi-previews 230 in the second display 200b.

A third display 200c corresponds to an embodiment in which the multi-previews 230 are output while sensing a main preview using a tele-photo camera in response to the second signal for dragging a touch point toward and touching 510 the preview 233 corresponding to the FOV of the tele-photo camera among the multi-previews 230 in the second display 200b.

In the first display 200a, a wide angle camera and a normal angle camera are activated, while a tele-photo camera is deactivated.

In the second display 200b, only the wide angle camera is activated.

In third display 200c, the wide angle camera and tele-photo camera are activated.

In the process of switching from the first display 200a to the second display 200b, the main preview displayed in the first region 210 is zoomed out, and only the wide angle camera may be in an active state.

In the process of switching from the second display 200b to the third display 200c, the main preview displayed in the first region 210 is zoomed in. In this connection, in a state in which a wide angle camera and a normal angle camera are activated sequentially, both the wide angle camera and tele-photo camera may be activated.

FIG. 8 shows an embodiment in which the controller maintains the outputting of the multi-previews 230 in response to the second signal. The process of generating the preview via the cropping is the same as illustrated in FIG. 7.

FIG. 9 is a view showing an embodiment in which the multi-previews 230 are displayed by touching the FOV information icons 250 according to the present disclosure.

The display 200a and 200b of the mobile terminal according to the present disclosure may include a touch screen for receiving a touch input signal.

In one example, the first signal for outputting the multi-previews 230 of the plurality of cameras may be input by the user touching the FOV information icons 250 corresponding to the plurality of cameras respectively for a predetermined time or greater.

The FOV information icons 250 may include a wide angle FOV information icon 251, a normal angle FOV information icon 252, and a tele-photo FOV information icon 253 to correspond to the plurality of cameras, respectively. However, FIG. 9 shows that the plurality of cameras include the wide angle camera, normal angle camera, and tele-photo camera. In another example, when more than three cameras are involved, corresponding four or more FOV information icons 250 are output.

Further, in response to the user touching 530 the FOV information icon 250 for the predetermined time or greater, the multi-previews 230 are output while a main preview corresponding to the touched FOV information icon 250 is output in the first region 210.

Specifically, in FIG. 9, in a first display 200a, a preview as sensed by a normal angle camera is output in the first region 210. In this state, when the user touches 530 a tele-photo FOV information icon 253 for the predetermined time or greater, the multi-previews 230 are generated in the second display 200b and the main preview is displayed in the first region 210 in the second display 200b where the main preview has been changed to the preview sensed by the tele-photo camera.

FIG. 10 is a view showing an embodiment in which a user pinch zooms in/out 540 the main preview with referring to multi-previews 230 according to the present disclosure.

Specifically, in FIG. 10, the controller may stop outputting of the multi-previews 230 in the second display 200b and may output the FOV information icons 250, in response to the user pinch-zooming in/out 540 the main preview in the first display 200a.

However, in some cases, in response to the user pinch-zooming in/out 540 the main preview in the first display 200a, the controller may maintain outputting of the multi-previews 230 and may zoom in/out the main preview and then change the main preview that is output in the first region 210.

FIG. 11 shows an example of capturing an image during recording using multi-previews 230 according to the present disclosure.

The first display 200a indicates an example in which one 550a of the outputted multi-previews 230 is touched for a time greater than a preset time to record an image using a corresponding camera to the touched multi-preview.

The second display 200b indicates an embodiment in which one 550b of the outputted previews 230 is touched for a time smaller than the preset time during recording to change the main preview outputted in the first region 210. However, even when the main preview has been changed, the camera performing the recording may not be changed.

The third display 200c indicates an example of capturing a picture during recording in response to a signal 550c to indicate capturing a picture using a changed main preview.

The detailed examples should not be construed in any way as limiting and should be considered illustrative. The scope of the present disclosure shall be determined by rational interpretation of the appended claims. All changes within an equivalent range of the present disclosure are included in the scope of the present disclosure.

What is claimed is:

1. A mobile terminal comprising:
   a plurality of cameras respectively having different field of views (FOVs);
   a display; and
   a controller configured to:
      control the plurality of cameras and the display;
      cause the display to display a preview of an image captured by an activated camera among the plurality of cameras; and cause the display to display multi-previews of an image in response to a first signal, each preview of the multi-previews corresponding to one of the plurality of cameras, wherein the controller is further configured to:

crop the preview of the image captured by the activated camera and generate a preview of an deactivated camera among the plurality of cameras using the cropped preview when a camera with an FOV that is smaller than an FOV of the activated camera among the plurality of cameras is in a deactivated state; and further activate a camera with a largest FOV among the plurality of cameras such that the activated camera with the largest FOV captures a preview of the image when a camera with an FOV that is larger than the FOV of the activated camera is in the deactivated state.

2. The mobile terminal of claim 1, wherein the controller is further configured to:

deactivate the camera with the FOV that is larger than the FOV of the activated camera;

crop a preview sensed by at least one of the activated cameras; and generate a preview of the deactivated camera with the larger FOV using the cropped preview.

3. The mobile terminal of claim 1, wherein the controller is further configured to activate another one of the plurality of cameras in response to a second signal selecting one of the multi-previews corresponding to the another camera such that the activated camera is switched to the activated another camera.

4. The mobile terminal of claim 3, wherein the controller is further configured to deactivate remaining cameras among the plurality of cameras other than the activated another camera in response to the second signal.

5. The mobile terminal of claim 4, wherein the controller is further configured to cause the display to stop displaying the multi-previews in response to the second signal.

6. The mobile terminal of claim 4, wherein the controller is further configured to:

cause the display to maintain displaying the multi-previews in response to the second signal; and maintain a camera with a largest FOV among the plurality of cameras to be in an active state when the activated another camera has an FOV smaller than the largest FOV.

7. The mobile terminal of claim 6, wherein the controller is further configured to:

crop a preview sensed by the activated another camera; and generate a preview of the deactivated camera using the cropped preview sensed by the activated another camera.

8. The mobile terminal of claim 3, wherein the controller is further configured to cause the display to:

display a preview of the activated camera in a first region of the display;

display each of the multi-previews in a second region of the display; and display a preview of the activated another camera in the first region.

9. The mobile terminal of claim 8, wherein the display includes a touch screen for receiving a touch input, and in response to the second signal generated by a user input comprising dragging a touch point toward the second region and touching the second region corresponding to a target preview among the multi-previews, the controller is further configured to:

zoom in or out the preview displayed in the first region based on a direction of the dragging; and activate a camera corresponding to the target preview among the plurality of cameras.

10. The mobile terminal of claim 8, wherein the controller is further configured to cause the display to apply a graphical effect to the target preview displayed in the second region, the target preview with the applied graphical effect corresponding to a preview displayed in the first region.

11. The mobile terminal of claim 3, wherein the controller is further configured to:

cause the display to display a preview of the activated camera in a first region of the display;

cause the display to display each of the multi-previews in a second region of the display; and cause the activated another camera to capture a preview while recording a preview displayed in the first region.

12. The mobile terminal of claim 1, wherein the multi-previews act as a plurality of real time thumbnails, each thumbnail respectively corresponding to one of the FOVs.

13. The mobile terminal of claim 1, wherein:

the display includes a touch screen for receiving a touch input; and the first signal is generated in response to a user input comprising touching an FOV information icon displayed on the display for at least a predetermined time duration, the touched FOV information icon corresponding to an FOV of one of the plurality of cameras.

14. The mobile terminal of claim 1, wherein the controller comprises no more than two Image Signal Processors (ISPs).

15. The mobile terminal of claim 14, wherein a number of the ISPs is two.

16. The mobile terminal of claim 15, wherein a number of the plurality of cameras is at least three.

17. The mobile terminal of claim 16, wherein the plurality of cameras are located on a same side of the mobile terminal.

18. The mobile terminal of claim 16, wherein the plurality of cameras includes at least:

a normal angle camera;
a tele-photo camera; and
a wide angle camera.

19. The mobile terminal of claim 18, wherein the controller is further configured to:

activate only the wide angle camera;
activate the wide angle camera and the normal angle camera; or
activate the wide angle camera and the tele-photo camera.

* * * * *